United States Patent Office 2,817,951
Patented Dec. 31, 1957

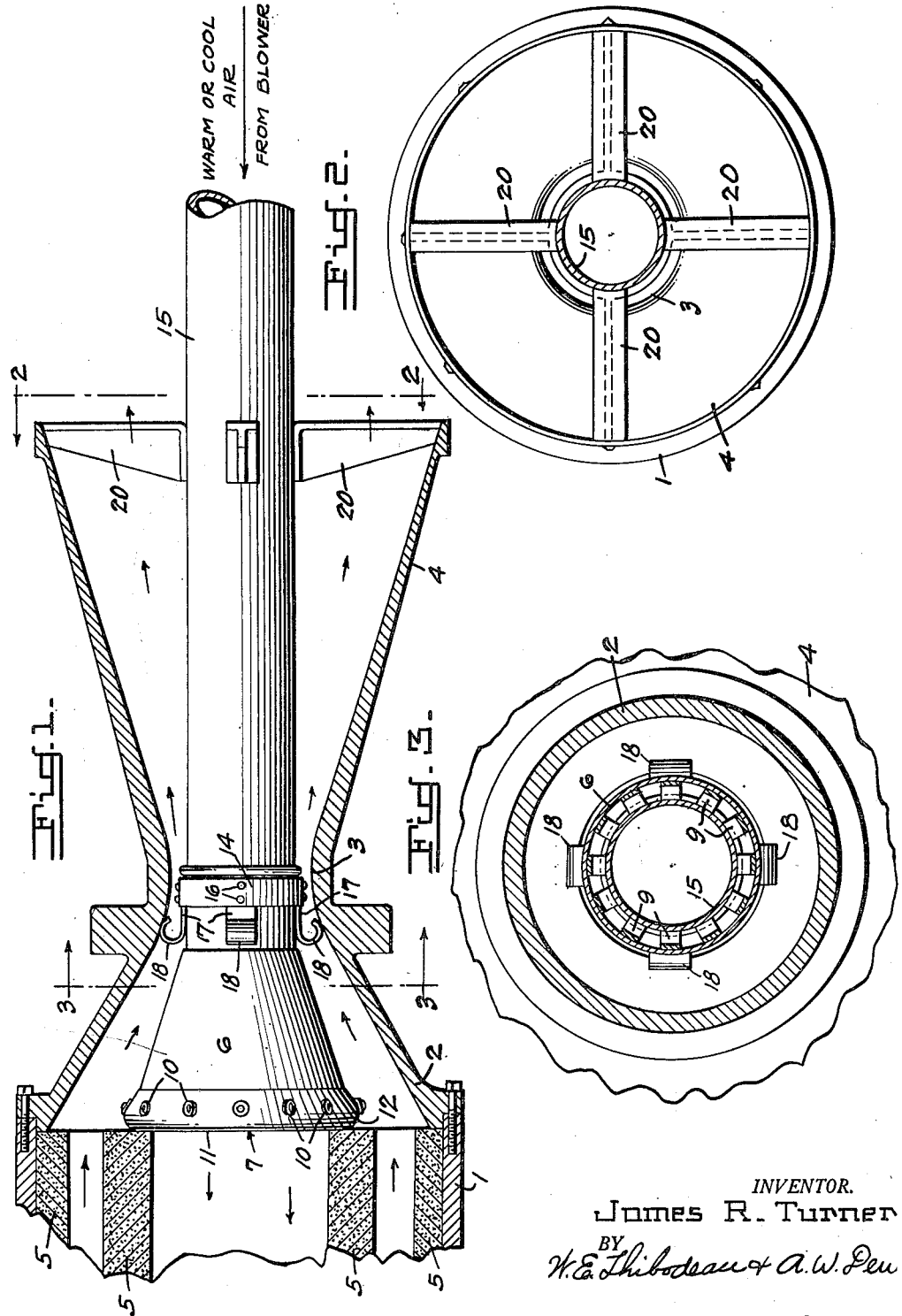

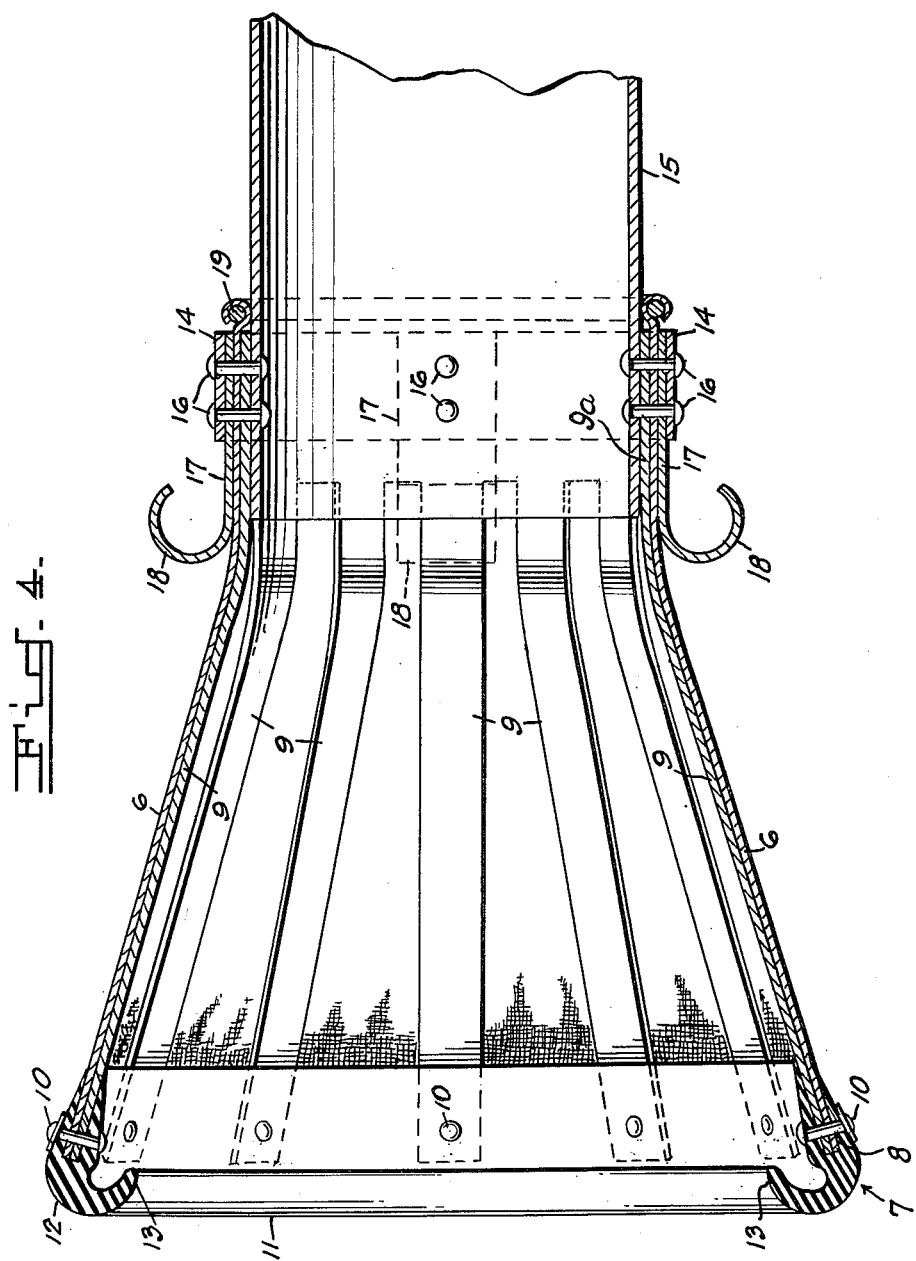

2,817,951

BOOSTER CONDITIONER

James R. Turner, Huntsville, Ala., assignor to the United States of America as represented by the Secretary of the Army Application February 4, 1953, Serial No. 335,179

3 Claims. (Cl. 60—35.6)

(Granted under Title 35, U. S. Code (1952), sec. 266)

The invention described herein may be manufactured and used by or for the Government for governmental purposes without the payment to me of any royalty thereon.

The present invention relates to a booster conditioner for rockets using solid propellants as their fuel. More particularly the present invention relates to a booster conditioner consisting of a collapsible adaptor made of flexible material which is inserted into the nozzle and rests against the propellant grains, and which includes a tube connected to a blower so that warm or cool air may be circulated through the rocket motor as the occasion demands to bring the propellant grains within certain temperature limits before the motor can be properly fired.

It is accordingly an object of the present invention to provide a booster conditioner which permits ready conditioning as regards temperature of solid propellants in a rocket motor before firing thereof.

It is another object of the present invention to provide a booster conditioner for propellants in rockets which is relatively inexpensive to manufacture and which can be put into operation by inserting the adapter end thereof into the nozzle of the rocket motor.

It is still another object of the present invention to provide a booster conditioner for solid propellant grains of rocket motors which is collapsible and thus may be directly inserted through the nozzle of the rocket.

A further object of the present invention is to provide a booster conditioner to bring the solid fuel of rocket motors within certain temperature limits before firing thereof, which is simple in structure and which is easy to handle.

It is a still further object of the present invention to provide a temperature conditioner to bring the solid grain propellants of rocket motors within a given temperature range before firing thereof which facilitates sequential application of the conditioner apparatus in relatively short time to any number of rocket motors.

These and other objects and advantages of the present invention will become obvious from the following description when taken in connection with the accompanying drawings which show for purposes of illustration only a preferred embodiment of my invention, and wherein:

Figure 1 is a partial longitudinal cross sectional view of the rocket motor, the rocket nozzle and the booster conditioner in accordance with the present invention;

Figure 2 is a cross sectional end view of the rocket nozzle taken along lines 2—2 of Figure 1 and showing the connecting pipe of the booster conditioner in cross section;

Figure 3 is a cross sectional view taken along lines 3—3 of Figure 1;

Figure 4 is a longitudinal, cross sectional view of the adaptor end of the booster conditioner in accordance with the present invention.

The booster conditioner device in accordance with the present invention constitutes a means for circulating warm or cool air through a solid-propellant rocket motor. It consists of a collapsible adaptor of a flexible material, such as canvas, rubber, etc., and a tube extending through the motor nozzle. The tube is connected to a blower which supplies warm or cool air as is needed; the adaptor fits against the propellant grains and directs the flow of air properly through the motor.

Referring now more particularly to the drawings wherein like reference numerals are used in the various figures thereof to designate like elements, reference numeral 1 indicates the casing of a rocket motor to which is fastened in any conventional manner nozzle 2 having a constricted throat portion 3 and an outwardly flared exit portion 4. The solid grain propellant which is indicated by reference numeral 5, may be of any shape and configuration, and is fastened within the rocket motor in any conventional manner as is well known in the prior art. Cylindrical or disclike, solid-grain propellants, which are retained within the rocket motor by means of trap rods, are one example thereof. However the present invention is not limited thereto but may be used with any other solid-grain propellant and fastening means of the prior art.

The booster conditioner comprises a flexible material such as canvas 6 fastened at its left end to a rubber ring 7 which may be of the moulded type and defines a medial portion tapering towards its forward and rearward edges thereof. Rubber ring 7 is provided with a circumferentially extending groove 8 which receives the flexible material 6 and a plurality of outwardly-flared spring-steel stays 9 which are integrally connected with a ring or sleeve 9a at their one ends only. The free ends of these stays are retained within groove 8 by any conventional fastening means such as rivets 10. The outside face 11 of rubber ring 7 is rounded off to curve inwardly as at 12 and made to overlap as at 13 to facilitate insertion through throat portion 3 of nozzle 2.

A metal ring 14 is used to fasten flexible material 6 and spring-steel stays 9 to metal tube 15 in any conventional manner as by means of rivets 16. A plurality of positioners 17 which may be made of steel spring are also fastened to ring 14 by means of rivets 16 on the otuside of flexible material 6. Positioners have outwardly extending, circularly-shaped portions 18 to facilitate insertion through throat porton 3 of nozzle 2 and retain the tube 15 in coaxial relationship with the nozzle throat 3 to provide a circular orifice therebetween to exhaust the expended conditioning air.

The right-hand part of flexible material 6 is rolled on wire ring 19. Flanges 20, which are secured to tube 15 as by welding, serve as positioning supports for the booster conditioner in the exit portion 4 of nozzle 2. Tube 15 is connected to a blower unit (not shown) which may be of the conventional type and may include a heating unit or air-conditioning unit so as to blow warm or cool air through tube 15 as may be needed. The flow of air into and out of the rocket motor 1 is indicated by appropriate arrows in Figure 1 of the drawing.

In the operation the booster conditioner is inserted through nozzle 2. This is made possible by the fact that the portion of the conditioner left of metal ring 14 is collapsible due to the resilient material of stays 9 so that it may readily pass through the constricted throat portion 3 of nozzle 2. Rounded edge 12 of rubber ring 7 and the circular shape 18 of positioners 17 made of resilient material greatly facilitate insertion and removal of the booster conditioner through nozzle 2, which is positioned therein by means of flanges 20 as well as by positioners 17.

While I have shown and described only one preferred embodiment of my invention, it will be obvious to those skilled in the art that it is not so limited, but is susceptible of various changes and modifications without departing from the spirit thereof, and I desire, therefore, that only such limitations shall be placed thereon as are imposed by the prior art or as are specifically set forth in the appended claims.

I claim:

1. A booster conditioner for solid propellants in rocket motors having a rearwardly extending nozzle comprising a substantially air-tight flexible material, a resilient member having a rounded-off outside portion, a plurality of resilient stays within said material, means for fastening one end of said flexible material and said stays to said resilient member at the side opposite said rounded-off portion, a sleeve member, a rigid air-conducting member, resilient spacers, further means for fastening the other end of said flexible material and said stays and said spacers to one end of said air-conducting member within said sleeve member, and a source of climatized air connected to the other end of said air-conducting member.

2. A booster conditioner for the solid propellant grain of a rocket motor having a rearwardly extending nozzle comprising a resilient rubber ring defining a medial portion tapering towards its forward and rearward edges thereof and having a circumferentially extending groove therein, its forward portion curving inwardly to substantially overlap the inner face of said medial portion, a metal sleeve having a portion thereof longitudinally slitted to form equiangularly spaced flexible stays extending therefrom the free ends thereof fitting in the groove in said rubber ring, a frusto-conical section of flexible sheet material having its larger end edge fitted into said circumferential groove externally of said stays, means securing the end edge of said stays and sheet material in the circumferential groove, a tube of rigid material having one end fitting within said metal sleeve, means securing the end edge of the sheet material of smaller diameter to and about said sleeve, and means securing the one end of said tube within said sleeve.

3. A booster conditioner for the solid propellent grain of a rocket motor having a rearwardly extending nozzle comprising a ring of resilient material, a metal sleeve having a plurality of equiangularly spaced metal stays extending from one end edge thereof and integrally united therewith, a frusto-conical section of flexible sheet material material having its larger end edge fitted to and about said ring externally of said stays and its smaller end fitted about said metal sleeve, means securing the free ends of said stays and the larger end of said sheet material to said ring, a tube of rigid material having one end fitting within said sleeve, a plurality of flexible positioners equally spaced about the smaller end of said frusto-conical sheet material and said metal sleeve to retain said sleeve and tube in spaced relationship with the interior wall of said nozzle, a metal ring surrounding the smaller end of said frusto-conical sheet material and sleeve to secure said flexible positioners thereto, and means securing the one end of said rigid tube within said sleeve and metal ring.

References Cited in the file of this patent

UNITED STATES PATENTS

| 1,314,670 | Juve et al. | Sept. 2, 1919 |
| 1,586,706 | Russell | June 1, 1926 |
| 2,089,940 | Brown | Aug. 17, 1937 |
| 2,383,733 | Parker | Aug. 28, 1945 |
| 2,674,088 | Riedel et al. | Apr. 6, 1954 |

FOREIGN PATENTS

| 183,085 | Great Britain | July 20, 1922 |